United States Patent [19]

Kamens et al.

[11] 4,167,613

[45] Sep. 11, 1979

[54] PROCESS FOR FOAMING A POLYMERIZABLE MEDIUM USING ACID SENSITIVE AZO COMPOUNDS WITH A POLYMERIZABLE MONOMER AND FREE RADICAL INHIBITOR

[75] Inventors: Ernest R. Kamens; Vasanth R. Kamath, both of Tonawanda, N.Y.

[73] Assignee: Pennwalt Corporation, Philadelphia, Pa.

[21] Appl. No.: 912,675

[22] Filed: Jun. 5, 1978

Related U.S. Application Data

[63] Continuation-in-part of Ser. No. 723,680, Sep. 15, 1976, abandoned.

[51] Int. Cl.$^2$ .................................................. C08J 9/10
[52] U.S. Cl. .................................... 521/118; 521/123; 521/128; 521/138; 521/155; 521/907
[58] Field of Search ................... 260/2.5 N; 521/118, 521/128, 138

[56] References Cited

U.S. PATENT DOCUMENTS

| | | | |
|---|---|---|---|
| 3,260,688 | 7/1966 | Watanabe et al. | 260/2.5 N |
| 3,823,099 | 7/1974 | Doyle | 260/2.5 N |
| 3,993,609 | 11/1976 | Kamens et al. | 260/2.5 R |
| 4,025,502 | 5/1977 | MacLeary et al. | 260/2.5 R |

*Primary Examiner*—Morton Foelak

[57] ABSTRACT

In the foaming of a polymerizable medium (such as an unsaturated polyester resin) by using acid sensitive azo compounds, significant improvement in the foaming efficiency can be obtained by incorporating in the resin medium 0.001%–10% by weight based on the weight of the resin compounds which exert an inhibiting effect on free radical polymerization. Examples of such compounds include methacrylonitrile, alphamethylstyrene and laurylmercaptan.

10 Claims, No Drawings

PROCESS FOR FOAMING A POLYMERIZABLE MEDIUM USING ACID SENSITIVE AZO COMPOUNDS WITH A POLYMERIZABLE MONOMER AND FREE RADICAL INHIBITOR

CROSS REFERENCE TO RELATED APPLICATIONS

This application is a continuation in part of Ser. No. 723,680 filed Sept. 15, 1976, now abandoned.

The invention relates to a process for foaming a polymerizable medium, e.g. unsaturated polyester resins, by using acid sensitive azo compounds and resins of the types described in commonly owned, copending applications of Kamens et al., Ser. No. 548,946, filed Feb. 11, 1975, (now U.S. Pat. No. 3,993,609) and Ser. No. 723,679 filed concurrently herewith and titled "Process for Preparing Foamed Solids Using Two or More Azo Compounds", and Ser. No. 453,444, filed Mar. 21, 1974 of MacLeay et al. (now U.S. Pat. No. 4,007,165) which describes certain acid sensitive azo compounds that are useful in the invention. The entire disclosure of each of the above-referenced applications is hereby incorporated herein by reference.

The said application filed concurrently herewith contains, as Example 4, an illustration of the foaming of a polyester resin syrup made using methacrylonitrile as one source of the unsaturation. The use of methacrylonitrile in said Example 4 was the invention of the present inventors and is part of the present invention.

Other polymerizable media and free radical initiators which can be used in the process of the present invention are found in our commonly-owned copending application Ser. No. 592,141, filed July 1, 1975 titled "Halo-Vinyl Resins and Processes of Making the Same", the entire disclosure of which is incorporated herein by reference.

THE PRIOR ART

U.S. Pat. No. 3,993,609 of Kamens et al. describes a process for foaming an acidulous or acidic polymerizable medium (e.g. unsaturated polyester resin), by using acid sensitive mono- or poly-azo compounds. These azo compounds contain the group:

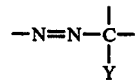

wherein Y is an acid sensitive group (e.g. OH, Cl, —OCN, —NCO).

Kamens et al. describe a wide variety of free-radical polymerizable media which can be used with the acid sensitive azo compounds to obtain cellular polymers. They further describe foaming unsaturated polyester resins and have shown by numerous examples that one can indeed obtain commercially acceptable foams. However, Kamens et al. have not described techniques of improving the foaming efficiency of the process without adding secondary blowing agents.

In the process of the present invention, we have found that by using certain additives (e.g. methacrylonitrile, laurylmercaptan), the foaming efficiency of the process can be increased and optimized. The increase in foaming efficiency permits the use of less of the acid sensitive azo foaming agent, thereby reducing the overall cost of the process.

Kamens et al. disclosed that the foaming efficiency of their process can be increased by using secondary blowing agents such as isobutane. However, R. B. Gallagher et al. (34th ANTEC, Society of Plastics Engineers, April 26-29, 1976, pp 173-176) have shown that the percentage of open cells in the foam increases when secondary blowing agents are used in conjunction with the acid sensitive azo foaming agents. This increase in open cell content of the foams alters the physical properties (e.g. they absorb more water) and is therefore not always desirable. In addition, the secondary blowing agents are highly volatile, low boiling compounds which makes their use cumbersome and difficult.

In the process of the present invention, foaming efficiency is improved by an easy and simple process and without using secondary blowing agents; therefore, the open cell content of these foams can remain unchanged.

Accordingly, the present invention provides improved foaming efficiency in the preparation of cellular polymers from unsaturated polyester resins in a process using acid sensitive azo compounds as foaming agents. It is an improvement on the process described in U.S. Pat. No. 3,993,609 whereby the amount of the azo foaming agent required to obtain the desired final foam density can be reduced. The polyester foams produced by the process of present invention can be more economical and can have utility in a large number of applications such as the construction of boats, moulds, furniture components, storage tanks, etc.

SUMMARY OF THE INVENTION

In the foaming of a polymerizable medium (such as an unsaturated polyester resin) by using acid sensitive azo compounds, significant improvement in the foaming efficiency can be obtained by incorporating in the resin medium 0.001%–10% by weight based on the weight of the resin compounds which exert an inhibiting effect on free radical polymerization. Examples of such compounds include methacrylonitrile, alphamethylstyrene and laurylmercaptan. In general, the invention includes a process for preparation of foamed polymeric solids wherein a liquid medium which is polymerizable and/or cross-linkable by a free radical initiator and which contains a polymerizable monomer is simultaneously foamed and cured in the presence of a free-radical initiator, and the improvement wherein said medium contains an additional compound which exerts an inbibiting effect on radical polymerization in an amount effective to improve the efficiency of said foaming, whereby less foaming agent is required to obtain a foam of a given density than the amount of said foaming agent which would be required if said additional compound were not present.

In the process, acid-sensitive mono- or poly-azo compounds containing the group:

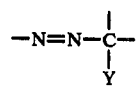

wherein Y is the acid sensitive group, are used to cure and foam an acidulous or acidic polymerizable medium consisting preferably of unsaturated polyester resins and compounds to improve foaming efficiency, such as methacrylonitrile, alphamethylstyrene, laurylmercaptan etc. to obtain cellular polymers.

In general, Y is as defined in U.S. Pat. No. 3,993,609 and is an acid sensitive group which in the presence of an acidulous or acidic polymerizable medium causes sufficient decomposition of the azo compound that gas is released in said medium and during said decomposition said mono- or poly-azo compound promotes polymerization and/or cross-linking of said medium to provide a matrix that is sufficiently polymerized and/or cross-linked that the generated gases cause the matrix to expand, each of the remaining valences being satisfied by an organic radical; provided that any carbon atom that is directly linked to an azo nitrogen, except that a carbonyl group, has at least two of its remaining three valences satisfied by a carbon to carbon bond or a carbon to hydrogen bond. For example, Y can be —OH, —Cl, —OOH, —OCN, —NCO etc. Acid sensitive azo compounds which can be used in the practice of the present invention are those disclosed in U.S. Pat. Nos. 3,993,609 and 4,007,165 (which are incorporated herein by reference). One or two or more of these acid sensitive compounds can be used in the process of the present invention.

The following is a partial list of the acid sensitive azo compounds:

1-t-butylazo-1-hydroxycyclohexane
2-t-butylazo-2-hydroxybutane
1-t-butylazo-1-acetoxycyclohexane
2-t-butylazo-2-methoxypropane
2-t-butylazo-2-hydroperoxy-4-methylpentane
2-t-butylazo-2-(t-butylperoxy)propane Among these various acid sensitive azo compounds, some are more readily susceptible to free radical reactions and as such can undergo decomposition by a free radical attack. This phenomenon can be visualized as an induced decomposition of the azo compound. Accordingly, certain azo compounds can be used to obtain cellular products from non-acidic polymerizable media, as is described hereinafter (and which is a part of the present invention).

Among the azo compounds which readily undergo induced decomposition are those where the Y group can be represented by XH, where X is X',

or —OO—, where X' is sulfur or oxygen, R is an alkyl group of 1 to 20 carbons, cycloalkyl group of 3 to 20 carbons, aralkyl group of 7 to 20 carbons or aryl group of 6 to 14 carbons,

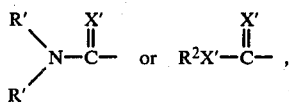

where R' is H—, lower alkyl group of 1-8 carbons, cycloalkyl group of 3 to 12 carbons, aralkyl group of 7 to 16 carbons or aryl group of 6 to 12 carbons, and where $R^2$ is the same as R' except it is not hydrogen.

The decomposition of these azo compounds in non-acidic polymerizable media can be accomplished by providing a source of free radicals to the media. In acidic or acidulous media, an adjuvant free radical initiating agent can be used in addition to said acid sensitive azo compound further to promote polymerization and/or cross-linking of said medium.

Various free radical sources such as peroxide and azo initiators, photosensitizers etc. are well known to those skilled in the art. In terms of processing convenience, it is preferred to use acids as activators in the decomposition of these azo compounds.

FURTHER DESCRIPTION OF THE INVENTION

The acidulous or acidic polymerizable medium used in the practice of this invention preferably consists of unsaturated polyester resins but is not restricted thereto. Kamens et al. U.S. Pat. No. 3,993,609 have described a wide range of polymerizable media, all of which can be useful in practice of the present invention. Improved foaming efficiency can be obtained in such polymerizable media if, without use of the present invention, the polymerization and/or cross-linking reaction proceeds at a rate such that the medium gels before complete volume expansion has occurred. In such cases, the maximum foaming efficiency of the azo blowing agent is not utilized. In some systems the maximum foaming efficiency of the blowing agent can be obtained without using the additives of this invention. Such maximum foaming can be obtained in systems that gel and/or cure slowly relative to the decomposition of the azo blowing agent. This can occur with the slower curing polymerizable media or with the faster decomposing azo compounds. In general, the improvement in foaming efficiency with the additives of this invention is most dramatic with the less acid sensitive and slower decomposing azo blowing agents, especially in fast gelling, polymerizable media. This is shown in Examples 1 and 2 herein, wherein a more pronounced improvement was obtained with the less acid sensitive azo compound in Example 1 ("LUCEL 6") than with the more acid sensitive azo compound in Example 2 ("LUCEL 4"). However, a significant improvement in foaming efficiency was still obtained with the more acid sensitive azo compound in Example 2.

The term acidulous polymerization medium denotes that the polymerization medium contains detectable acid number without an added extraneous acid.

The prefered polymerization medium contains unsaturated polyester resins. The term unsaturated polyester resins as used here denotes a resin system consisting of an alkyd portion dissolved and/or dispersed in one or more free radically polymerizable monomers. The alkyd portion of the resin system is obtained by esterifying preferably ethylenically unsaturated di- or polycarboxylic acids or their anhydrides or their acid halides, such as maleic acid, fumaric acid, glutaconic acid, itaconic acid, mesaconic acid, citraconic acid, allyl malonic acid, allyl succinic acid, tetrahydrophthalic acid, 2,3-dicarboxybicyclo (2.2.1) heptene and others, with saturated or unsaturated di- or polyalcohols, such as ethylene glycol, diethylene glycol, triethylene glycol, may also be used. The unsaturated di- or polycarboxylic acids may be replaced, at least partly, by unreactive, saturated polycarboxylic acids, such as adipic acid, succinic acid, sebacic acid and others and/or by aromatic polycarboxylic acids, such as phthalic acid, trimellitic acid, pyromellitic acid, isophthalic acid and terephthalic acid. The dibasic acid may be polymeric with terminal carboxylic acid groups, such as those prepared by polymerizing monomers such as styrene, butadiene, isoprene and chloroprene with initiators containing carboxylic acid groups in each initiating fragment, i.e. 4,4'-azobis-(4-cyanovaleric acid) or by treating living anionic polymers with carbondioxide. The polymerization medium may contain a mixture of two or more different polymers, one or more of which is active. The term active is used to denote that the polymer is capable of undergoing free radical polymerization and/or crosslinking reactions.

The monomers used to dissolve or disperse the alkyd are selected on the basis of their ability to copolymerize and/or crosslink with the alkyd. Monomers of this type are well known to those skilled in the art. A partial list of such monomers is given below:
 styrene
 vinyl toluene
 methyl methacrylate
 diallyl phthalate
 dibutyl fumarate
 triallyl cyanurate
 divinyl benzene
 methyl acrylate
 vinyl acetate
 vinyl pyridine
 butyl acrylate
 p-chlorostyrene
 p-methoxystyrene
 methacrylic acid
 isoprene etc.

It is preferred to select the monomer or mixture of monomers such that the polymer (e.g. alkyd) can be dissolved in it. The ratio of polymer to monomer or monomer mixture may vary over a wide range. Generally a ratio of polymer to monomer between about 0.2:1 to 4:1 is suitable.

According to the process of the present invention, incorporating 0.001 to 10% by weight based on the weight of the resin, compounds which exert an inhibiting effect on free radical polymerization, increases the foaming efficiency of the process. These compounds act as free radical scavengers in the system thereby reducing the polymerization/crosslinking rate.

Compounds which can be used in the practice of this invention are known in the art. These include phenolic retarders, chain-transfer agents and free radical scavenging unsaturated compounds. The Polymer Handbook (Brandrup and Immurgut, Editors, 2nd Edition, Wiley-Interscience Publication, 1975) has an extensive listing of such compounds and is herein incorporated by reference. Chain-transfer agents are particularly useful in the practice of this invention. The preferred chain-transfer agents are those which have a high chain-transfer constant (i.e. greater than 1.0) in the appropriate polymerization medium. The value of the chain-transfer constants is readily available in the Polymer Handbook (ibid). The alkyl and aryl mercaptans are examples of preferred chain-transfer agents in the practice of this invention. The most preferred are lauryl mercaptan, 1-butanethiol, 1,1,3,3-tetramethylbutanethiol, 1-naphthalenemethanethiol, o-mercaptobenzoic acid and 2,2'-dithiobis-benzothiozole.

Examples of the free radical scavenging unsaturated compounds used in the present invention are vinyl ethers, isopropenyl ethers, hydrocarbon olefins, methacrylonitrile and alpha-methylstyrene. Preferred hydrocarbon olefins are 2-butene, propene, isobutene and butene-1. Examples of the phenolic retarders preferred in this invention are p-benzyloxyphenol, 2,6-diisopropylphenol, p-methoxyphenol, 2,3,4,6-tetramethylphenol and 2,4,6-trinitrophenol.

The concentration of the specific compound used in the process will depend on the polymerization medium and other factors such as the reactivity of the medium (e.g. acid number, degree of unsaturation, the concentration of crosslinking monomer etc.), the acid sensitivity of the azo compound used etc. The preferred concentration range with unsaturated polyester resins as the polymerization medium is between 0.001% to 10.0% by weight based on total weight of the resin medium.

With unsaturated polyester resins, it is generally sufficient to use a single specific compound to obtain the desired increase in foaming efficiency. However, depending on the polymerization medium, a mixture of two or more specific compounds (e.g. methacrylonitrile and laurylmercaptan) may be used to obtain the desired results.

The acid sensitive azo compounds used in the practice of this invention decompose in acidulous or acidic polymerizable medium (as defined in U.S. Pat. No. 3,993,609). Thus acids, both organic and inorganic can be used to "promote" or "activate" the decomposition. In addition, compounds which decompose and/or react to produce free radicals in the polymerization medium (e.g. acetylcyclohexylsulfonyl peroxide) can also be used to activate the decomposition of some of the acid sensitive azo compounds in an acid-free polymerizable medium.

Among the activators and other ingredients such as fillers, curing agents, vaporizing adjuvants, nucleation and stabilization agents etc. which can be used in the practice of the present invention are those disclosed in U.S. Pat. No. 3,993,609.

Various molding techniques can be used to shape or mold the cellular structure that is produced during foaming of the resin. The mold system can be quiescent or dynamic, i.e., the initial reactants may be mixed in a mold in suitable proportions and permited to react until the mold is filled or alternatively the mixed reactants can be charged into a mold immediately after mixing, and before substantial gas generation or polymerization. In other systems the reactants can be mixed and extruded in various forms, such as sheets, rods, beads, sprays or droplets. Typical molds used in the furniture industry (room temperature vulcanizable silicone, polyurethane, and epoxy) are quite acceptable. The resultant foam piece accurately reproduces surface detail present on the mold. Sheets of the foamed product may also be formed simply by pouring the mixed reactants upon a flat surface or calendering the mixed reactants during or prior to reaction.

ILLUSTRATIVE EXAMPLES

In the following examples, formulations are mixed at room temperature in 9 oz. waxed paper cups using a high speed, high shear electric mixer. All ingredients of the formulation except the acid sensitive azo compound are initially blended thoroughly. The azo compound is then added and blended at high speed for 30–45 seconds.

The reaction exotherm results are obtained by inserting a thermocouple wire in the resin medium. The temperature of the resin medium as a function of time is then recorded using a strip-chart recorder.

After foaming and curing is complete, the weight and the volume (by water displacement) of the foam is determined, from which the foam density is calculated.

When additives such as methacrylonitrile or α-methylstyrene are added to the formulation, the corresponding amount of styrene is removed from the unsaturated polyester resin.

Two of the unsaturated polyester resins used, Stypol 40-7502 and Reichhold IC-129, contained surfactant as received and additional surfactant was not required to obtain good cell size in the foams.

The following lists the chemical identity and source of materials which are identified by Trademarks in the Examples:

Stypol 40-7502*: Unsaturated polyester resin commercially available from Freeman Chemical Corporation.

Laminac 4123*: Unsaturated polyester resin commercially available from American Cyanamid Company.

Reichhold IC-129*: Unsaturated polyester resin commercially available from Reichhold Chemicals Limited.

*All contained styrene as the monomer.

Hydrated alumina—Grade GHA—332 from Mineral Products Division, Great Lakes Foundry Sand Company.

Laurylmercaptan (or 1-dodecanethiol) from Aldrich Chemical Co., Inc.

Methacrylonitrile from Eastman Organic Chemicals, Division of Eastman Kodak Company.

α-Methyl styrene from Allied Chemical Corporation.

t-Butylperbenzoate from Lucidol Division, Pennwalt Corporation.

Lucel-4: 2-t-butylazo-2-hydroxybutane from Lucidol Division, Pennwalt Corporation.

Lucel 6: 1-t-butylazo-1-hydroxycyclohexane from Lucidol Division, Pennwalt Corporation.

EXAMPLE 1

Improving Foaming Efficiency of Lucel-6 with Methacrylonitrile

The following formulation was used to evaluate the effect of methacrylonitrile on foaming efficiency:

|  | parts by weight |  |  |
|---|---|---|---|
| Stypol 40-7502 | 60.0 |  |  |
| Hydrated alumina | 40.0 |  |  |
| t-butylperbenzoate | 0.5 |  |  |
| Lucel-6 | 1.0 |  |  |
| Methacrylonitrile | Variable |  |  |
| Results |  |  |  |
| Parts, Methacrylonitrile | 0 | 3 | 4* |
| Peak exotherm temperature, °F. | 177 | 173 | 170 |
| Time to peak exotherm, mins. | 5.5 | 10.6 | 12.0 |
| Foam density, lbs/cu. ft. | 47.5 | 36.0 | 36.0 |

*This experiment was repeated by using 0.2 parts t-butylperbenzoate instead of 0.5 parts; the final foam density in this case was 34 lbs/cu. ft.

EXAMPLE 2

Improving Foaming Efficiency of Lucel-4 with Methacrylonitrile

The following formulation was used to evaluate the effect of methacrylontrile on foaming efficiency:

|  | parts by weight |  |  |  |
|---|---|---|---|---|
| Stypol 40-7502 | 60.0 |  |  |  |
| Hydrated alumina | 40.0 |  |  |  |
| t-butylperbenzoate | 0.5 |  |  |  |
| Lucel-4 | 1.0 |  |  |  |
| Methacrylonitrile | Variable |  |  |  |
| Results |  |  |  |  |
| Parts, Methacrylonitrile | 0 | 1 | 2 | 4 |
| Peak exotherm temperature, °F. | 155 | 142 | 143 | 147 |
| Time to peak exotherm, mins. | 5.0 | 6.2 | 7.2 | 9.3 |
| Foam density, lbs/cu. ft. | 32 | 30 | 28 | 26.5 |

EXAMPLE 3

Improving Foaming Efficiency of a Mixture of Lucel-4 and 6 with Methacrylonitrile The following formulation was used to evaluate the effect of methacrylonitrile on the foaming efficiency of a mixture of Lucel-4 and 6:

|  | parts by weight |  |
|---|---|---|
| Stypol 40-7502 | 60.0 |  |
| Hydrated alumina | 40.0 |  |
| t-butylperbenzoate | 0.25 |  |
| Lucel-4 | 0.50 |  |
| Lucel-6 | 0.50 |  |
| Methacrylonitrile | Variable |  |
| Results |  |  |
| Parts, Methacrylonitrile | 0 | 2 |
| Peak exotherm temperature, °F. | 166 | 155 |
| Time to peak exotherm, mins. | 6.9 | 11.5 |
| Foam density, lbs/cu. ft. | 35 | 33 |

EXAMPLE 4

Improving Foaming Efficiency of Lucel-6 with α-Methyl Styrene

The following formulation was used to evaluate the effect of α-methyl styrene on the foaming efficiency:

|  | parts by weight |  |
|---|---|---|
| Laminac 4123 | 100 |  |
| Dow Corning 193, Surfactant | 1.0 |  |
| t-butylperbenzoate | 0.20 |  |
| Lucel-6 | 2.50 |  |
| α-methyl styrene | Variable |  |
| Results |  |  |
| Parts, α-methyl styrene | 0 | 5 |
| Peak exotherm temperature, °F. | 305 | 280 |
| Time to peak exotherm, mins. | 7.8 | 17 |
| Foam density, lbs/cu. ft. | 18 | 12.5 |

EXAMPLE 5

Improving Foaming Efficiency of Lucel-6 with Laurylmercaptan

The following formulation was used to evaluate the effect of laurylmercaptan on foaming efficiency:

|  | parts by weight |  |  |
|---|---|---|---|
| Reichhold IC-129 | 60.0 |  |  |
| Hydrated Alumina | 40.0 |  |  |
| t-butylperbenzoate | 0.25 |  |  |
| Lucel-6 | 1.0 |  |  |
| Laurylmercaptan | Variable |  |  |
| Results |  |  |  |
| Parts, Laurylmercaptan | 0 | 0.1 | 0.2 |
| Peak exotherm temperature, °F. | 280 | 283 | 277 |
| Time to peak exotherm, mins. | 7.7 | 12.7 | 15.3 |
| Foam density, lbs/cu. ft. | 47 | 38.4 | 35 |

What is claimed is:

1. In a process for preparation of a foamed polymer from a reaction mass comprised of a polyester and an ethylentically unsaturated monomer wherein the reaction mass is simultaneously foamed and cured in the presence of a free-radical initiator comprising one or more acid sensitive mono- or poly-azo compounds containing the group:

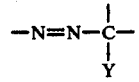

wherein Y is an acid sensitive group which in the presence of an acidulous or acidic polymerizable medium causes sufficient decomposition of the azo compound that gas is released in said medium and during said decomposition said mono- or poly-azo compound promotes polymerization and/or crosslinking of said medium to provide a matrix that is sufficiently polymerized and/or crosslinked that the generated gases caused the matrix to expand, each of the remaining valances being satisfied by an organic radical provided that any carbon atom that is directly linked to azo nitrogen, except that of a carbonyl group, has at least two of its remaining three valances satisifed by a carbon to carbon bond or a carbon to hydrogen bond, the improvement comprising adding to said reaction mass from 0.001 to 10% of at least one additional different compound which exerts an inhibiting effect on free-radical polymerization selected from the group consisting of (a) phenolic retarder selected from p-benzyloxyphenol, 2,6-diisopropylphenol, p-methoxyphenol, 2,3,4,6-tetramethylphenol or 2,4,6-trinitrophenol, (b) alkyl and aryl mercaptan chain transfer agent, and (c) free-radical scavenging unsaturated compound that is nonpolymerizable by free-radical initiation selected from vinyl ethers, isopropenyl ethers, 2-butene, propene, isobutene or butene-1, in an amount effective to improve the efficiency of said foaming, whereby less foaming agent is required to obtain a foam of a given density than the amount of said foaming agent which would be required if said additional compound were not present.

2. The process of claim 1 wherein the free radical scavenging unsaturated compound is selected from vinyl ethers or isopropenyl ethers, hydrocarbon olefins.

3. The process of claim 2 wherein the hydrocarbon olefins is selected from the class consisting of 2-butene, butene-1, propene, and isobutene.

4. The process of claim 1 wherein the mercaptan type chain transfer agent is selected from the group consisting of alkyl mercaptans and aryl mercaptans.

5. The process of claim 1 further characterized in that an adjuvant free radical initiating agent is used in addition to said acid sensitive azo compound further to promote polymerization and/or cross-linking of said medium.

6. The process of claim 1 further characterized in that acidity is supplied to said medium by adding an acidic promoter thereto.

7. The process of claim 1 wherein said medium comprises a polymer integrally containing an acidic function and no added acidic promoter is supplied thereto.

8. The process of claim 1 wherein reaction mass which is polymerizable comprises a polyester resin and monomeric styrene.

9. The process of claim 5 wherein said free radical initiator is selected from 2-t-butylazo-2-hydroxybutane, 1-t-butylazo-1-hydroxycyclohexane and mixtures thereof.

10. The process of claim 7 wherein from 0.001–10% by weight of laurylmercaptan is added to said liquid medium.